Patented Dec. 20, 1949

2,491,660

UNITED STATES PATENT OFFICE 2,491,660

PREPARATION OF ESTERS OF TEREPHTHALIC ACID

William F. Gresham, Wilmington, Del., assignor to E. I. du Pont de Nemours & Company, Wilmington, Del., a corporation of Delaware No Drawing. Application January 15, 1947, Serial No. 722,299

7 Claims. (Cl. 260—475)

This invention relates to improvements in the preparation of esters of terephthalic acid and more particularly to an improved process for the preparation of n-butyl esters of terephthalic acid whereby losses of n-butanol to dehydration products such as di-n-butyl ether are decreased or completely avoided.

Although terephthalic acid is only very slightly soluble in alcohols the esterification thereof can be carried out by heating terephthalic acid with certain alcohols at the boiling point in the presence of acidic catalysts. However, appreciable losses of the alcohols to dehydration products, such as ethers, are frequently encountered. For example, in the esterification of terephthalic acid with n-butanol in the presence of a minimum quantity of sulfuric acid, about 15 to 20% of the n-butanol is lost by conversion to di-n-butyl ether. Still larger losses occur with alcohols higher than n-butanol.

The esters of terephthalic acid can be prepared quite readily by ester interchange reactions, using comparatively mild catalysts, but this procedure is disadvantageous because it is indirect, and because it requires a preliminary esterification of terephthalic acid.

The difficulties which are encountered in the esterification of terephthalic acid are quite serious economically especially when the object is to prepare diesters of terephthalic acid, because in the preparation of these diesters it is preferable to employ a very large excess of the alcohol, and high percentage losses of the alcohol correspond to even larger losses per unit weight of the desired diester formed.

An object of this invention is to provide a process whereby esters of terephthalic acid can be prepared without a substantial loss of alcohol during the esterification reaction. A further object is to provide a novel catalytic process for the esterification of terephthalic acid with n-butanol, without the use of acidic catalysts. Other objects of the invention will appear hereinafter.

These objects are accomplished in accordance with this invention by heating terephthalic acid with an excess of the alcohol (e. g. an alkanol having from 1 to 4 carbon atoms per molecule) at a temperature of about 225° to 350° C. under superatmospheric pressure in the presence of a (i. e. at least one) catalyst of the class consisting of zinc oxides, lead oxides, zinc salts of weak acids having an ionization constant lower than $10^{-3}$ and lead salts of weak acids having an ionization constant of lower than $10^{-3}$. In specific embodiments, the alcohol employed is n-butanol, and the initial mol ratio of terephthalic acid to n-butanol is within the range 1:6 to 1:20. The esterification may be conducted conveniently at a pressure in excess of 25 atmospheres, pressures of about 50 to 500 atmospheres being preferred. The invention is illustrated further by means of the following examples.

*Example 1.*—A mixture containing 33 grams terephthalic acid (0.2 M.), 105 grams n-butanol (1.6 M.), 1.5 grams zinc borate ($ZnB_4O_7$) is heated at a temperature of 250° for one hour at a pressure slightly in excess of 50 atmospheres. The resulting product is withdrawn from the reaction vessel, and distilled for recovery of unreacted n-butanol. The distillation residue is distilled at a pressure of 2 to 3 mm. yielding 36.5 grams of mixed terephthalic esters having a boiling point of 158° to 178.5° at about 3 mm. No di-n-butyl ether or other dehydration product of n-butanol is obtained.

*Example 2.*—A mixture containing 50 grams terephthalic acid, 178 grams n-butanol, 2.3 grams lead oxide (PbO) and 1.5 grams of zinc oxide (ZnO) is heated at a temperature of 250° C. for one hour under a pressure of 107 to 126 atmospheres. The resulting product is withdrawn from the reaction vessel and is distilled for recovery of unreacted n-butanol. The residue is distilled at a pressure of about one mm., and this distillation yields 48.4 grams of di-n-butyl terephthalate having a boiling point at 132° to 141° C. at 1 mm. No di-n-butyl ether or other dehydration product of n-butanol is obtained.

*Example 3.*—A mixture containing 50 grams of terephthalic acid, 178 grams of n-butanol and 2.3 grams of lead oxide (PbO) is heated for one hour at a temperature of about 250° under a pressure of about 25 atmospheres. Distillation of the resulting product gives a high yield of a mixed n-butyl terephthalate having a boiling range of 170° to 181° at 5 mm. No di-n-butyl ether or other dehydration product of n-butanol is obtained.

*Example 4.*—Example 3 is repeated using zinc oxide (ZnO) in place of lead oxide as the esterification catalyst. A similar result is obtained.

*Example 5.*—Example 3 is repeated using lead borate as the catalyst in place of lead oxide. A similar result is obtained.

*Example 6.*—In a series of experiments terephthalic acid is esterified with n-butanol in a closed vessel in the presence of about 1.5% of a mixed PbO-ZnO catalyst, based on the total weight of the reaction mixture. The results are tabulated in the following table.

*Esterification of terephthalic acid in the presence of ZnO-PbO catalyst*

| Initial Mol Ratio Terephthalic acid: n-butanol | Temp. | Press. Atms. | Reaction Time | Conversion of terephthalic acid to esters [1] | Loss of n-butanol to dehydration products |
|---|---|---|---|---|---|
| | °C. | | Hours | Per cent | Per cent |
| 1:8 | 200–210 | ca. 40 | 1.0 | 14.8 | nil |
| 1:8 | 244–256 | ca. 50 | 4.0 | 91 | nil |
| 1:8 | 245–260 | ca. 50 | 1.0 | ca. 84 | nil |
| 1:8 | 300 | 80 | 1.0 | 92.5 | nil |
| 1:8 | 400 | 400–455 | 1.0 | 2 | ca. 50 |

[1] Chiefly di-n-butyl terephthalate.

It is to be understood that the above examples do not limit the invention but rather serve to illustrate certain preferred methods for practicing the same. Numerous modifications of the invention will occur to those skilled in the art. For example, the esterification reaction may be carried out either batchwise or continuously, and means may be employed for withdrawing water from the reaction mixture while the esterification is in progress if desired. The esterification reaction may be carried out in any convenient reaction vessel such as a stirred autoclave or a high pressure still.

The catalysts which may be employed in the practice of the invention include not only the oxides of lead and zinc but also the salts of these metals with weak acids such as zinc stearate, zinc naphthenate, lead acetate, lead isobutyrate, lead oleate, and the like. In preferred embodiments these catalysts are employed in a finely powdered form. It is, of course, to be understood that mixtures of two or more of these catalysts may be employed; in fact, the use of such mixtures is frequently advantageous in obtaining maximum yields of the desired esters.

Since many embodiments of the invention may be made without departing from the spirit and scope thereof, it is to be understood that I do not limit myself except as set forth in the following claims.

I claim:

1. A process for the preparation of esters of terephthalic acid which comprises heating terephthalic acid with an excess of an alkanol having from 1 to 4 carbon atoms per molecule at a temperature of about 225° to 350° C. under superatmospheric pressure in the presence of a catalyst of the class consisting of zinc oxides, lead oxides, zinc salts of weak acids having an ionization constant lower than $10^{-3}$ and lead salts of weak acids having an ionization constant lower than $10^{-3}$, and thereafter separating the terephthalic acid esters thus formed from the resulting reaction mixture.

2. A process for the preparation of n-butyl esters of terephthalic acid which comprises heating terephthalic acid with an excess of n-butanol at a temperature of about 225° to 350° C. under superatmospheric pressure in the presence of a catalyst of the class consisting of zinc oxides, lead oxides, zinc salts of weak acids having an ionization constant lower than $10^{-3}$, and lead salts of weak acids having an ionization constant lower than $10^{-3}$, and thereafter separating n-butyl terephthalate from the resultant reaction mixture.

3. A process for the preparation of n-butyl esters of terephthalic acid which comprises heating terephthalic acid with n-butanol in the mol proportions of 1:6 to 1:20 at a temperature of about 225° to 350° C. under a pressure of about 50 to 500 atmospheres in the presence of a catalyst of the class consisting of zinc oxides, lead oxides, zinc salts of weak acids having an ionization constant of $10^{-3}$, and lead salts of weak acids having an ionizaton constant of less than $10^{-3}$, and thereafter separating n-butyl esters of terephthalic acid from the resultant reaction mixture.

4. A process for the preparation of n-butyl esters of terephthalic acid which comprises heating terephthalic acid with n-butanol in the mol proportions of about 1:6 to 1:20 at a temperature of about 300° C. under a pressure of about 50 to 500 atmospheres for at least about one hour in the presence of catalytic quantities of ZnO and PbO and thereafter separating di-n-butyl phthalate from the resulting reaction mixture.

5. The process for the preparation of n-butyl esters of terephthalic acid which comprises heating terephthalic acid with n-butanol in mol proportions of about 1:6 to 1:20 at a temperature of about 225° to 350° C. under pressure of about 50 to 500 atmospheres in the presence of a catalyst consisting of ZnO and PbO, and thereafter separating n-butyl esters of terephthalic acids from the resulting reaction mixture.

6. A process for the preparation of n-butyl esters of terephthalic acid which comprises heating terephthalic acid with n-butanol in the mol proportions of about 1:6 to 1:20 at a temperature of about 225° to 350° C. under a pressure of about 50 to 500 atmospheres in the presence of a zinc borate catalyst and thereafter separating n-butyl esters of terephthalic acid from the resultant reaction mixture.

7. A process for the preparation of n-butyl esters of terephthalic acid which comprises heating terephthalic acid with n-butanol in the mol proportions of about 1:6 to 1:20 at a temperature of about 225° to 350° C. under a pressure in excess of about 50 to 500 atmospheres in the presence of a zinc oxide catalyst and thereafter separating n-butyl esters of terephthalic acid from the resultant reaction mixture.

WILLIAM F. GRESHAM.

REFERENCES CITED

The following references are of record in the file of this patent:

UNITED STATES PATENTS

| Number | Name | Date |
|---|---|---|
| 1,925,590 | Jaeger | Sept. 5, 1933 |
| 2,091,241 | Kvalnes | Aug. 24, 1937 |
| 2,199,653 | Segessemann | May 7, 1940 |
| 2,278,674 | Segessemann | Apr. 7, 1942 |

OTHER REFERENCES

Davidis, J. Prakt. Chemie., 2nd Series, V. 54 (1896) p. 78.